INVENTORS
NELSON N. ESTES
GEORGE E. EVANS
FRED L. GRANGER

BY *John F. Hohmann*
ATTORNEY

3,209,255
ELECTRO-OSMOTIC CURRENT INTEGRATOR WITH CAPILLARY TUBE INDICATOR

Nelson N. Estes, Austin, Tex., and George E. Evans, Rocky River, and Fred L. Granger, Lakewood, Ohio, assignors to Union Carbide Corporation, a corporation of New York Filed Apr. 22, 1960, Ser. No. 23,975
6 Claims. (Cl. 324—94)

Many years ago it was observed that a polar liquid can be caused to pass through a porous solid when a voltage is impressed between electrodes in contact with the liquid. The phenomenon, referred to as "electro-osmosis," has been studied by electrochemists, but little practical use has been made of it.

In accordance with the present invention, advantage is taken of the phenomenon to provide for visual indication of a voltage or the quantity of current passed through a circuit over a period of time. By the practical application of electro-osmosis in accordance with the invention, instruments such as a state of charge indicator for a battery, or a coulometer are made available. In short, the principal object of the invention is a device which may be termed an electro-osmotic integrator, that is, a device which will integrate voltage or current over a period of time by the phenomenon of electro-osmosis.

Figure 1:
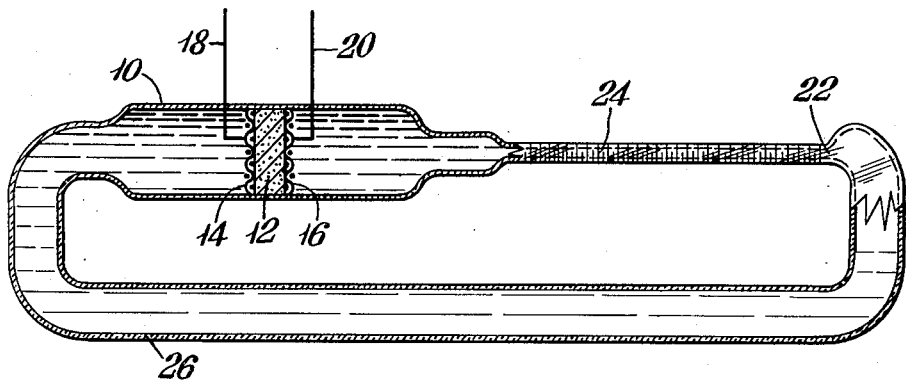
Figure 2:
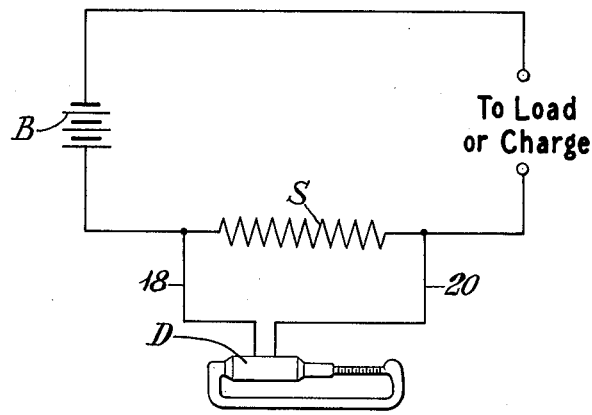

In the accompanying drawing:

FIG. 1 is an elevation, part being broken away, of a device embodying the invention; and FIG. 2 is a circuit diagram showing the device used for integrating the drain on a battery.

The invention comprises the combination of an electro-osmotic cell and a calibrated capillary communicating with it. Referring to the drawing, within a vessel 10, suitably fabricated of glass or plastic is a porous disc 12 preferably composed of "fritted" glass (or other dielectric material), a product obtainable from glass manufacturers, the disc 12 separating the vessel into two compartments. One each of a pair of electrodes 14, 16 is provided in each of the two compartments of the vessel 10 and in close proximity to the disc 12. Suitable leads 18, 20 to the electrodes 14, 16 are provided for connection to a voltage or current source, for instance as shown in FIG. 2. Communicating with one of the two compartments of the vessel 10 is a capillary 22 which is calibrated or provided with a scale 24. As shown at 26, the capillary 22 may be extended and returned so that it communicates with and provides a passage to the other of the two compartments of the vessel 10. Both compartments of the vessel 10 are filled with a liquid and a gas bubble, or other suitable means, is provided in the capillary 22 for indicating the movement of liquid therethrough on the scale 24.

The liquid utilized in the device of the invention must be polar, should have a low viscosity and should have a high dielectric constant. A number of liquids have been used for such devices including water, acetone, methanol, ethanol, acetonitrile and propionitrile. Of these, water or acetone are generally preferred, principally for reasons of economy.

The electrodes utilized in the device of the invention are reversible metal-metal ion electrodes of the type called "electrodes of the first kind." That is, if silver is selected as the electrode material, and it is preferred, then the electrode will consist of the metal in contact with, and in equilibrium with, metal ions of the electrode material, the total electrode being designated $Ag/Ag^+$. To insure equilibrium of the desired electrode, a trace of the metal salt, for example, silver chloride in the case of the silver-silver ion electrode, may be present in the liquid in the appropriate compartment of the vessel 10.

Since the electrodes must be porous, it is convenient that they be formed on a screen or gauze support, preferably of the same metal. For example, an aqueous paste of silver oxide ($Ag_2O$) may be formed and provided on a silver screen. The paste is heated to dryness and then heated strongly to reduce the oxide to metallic silver in situ, thus providing a porous mass on the screen.

In addition to silver, metals suitable for use in the device of the invention include thallium, copper, cadmium, and lead. For conciseness, electrodes may be referred to as $Me/Me^+$.

As indicated above, the disc 12 preferably is composed of fritted glass, although it is essential only that it be of the proper porosity and inertness to the liquid used. It must be porous, but the pores must be tiny. Preferably, the diameter of the pores should be in the range of 0.01 to 1 micron. It is essential to the practical operation of the device that the pressure developed across the disc be high to prevent inaccuracies caused by tilting of the device, and it is for this reason that pore diameter is important.

In order to use an osmotic pressure transducer as an electric current integrator, the pressure developed across the disc due to applied voltage must be large compared to any other pressure drop in the system. Therefore, an absence of diaphragms is desirable. The characteristics of one osmotic unit which was tested are as follows:

The disc is made from porcelain with approximately 25% porosity. The nominal pore diameter is 1 micron. The diameter of the disc is 20 mm. and is sealed into a glass housing. $Ag/Ag^+$ electrodes are on either side of the disc. Water is used as the liquid. The disc thickness is 3.0 mm. The capillary into which the cell works is 0.5 mm. diameter. Electrical resistance is 18000 ohms (A.C.). Using the current through the cell times the resistance, the voltage across the disc is determined.

Calibration of the device indicated that the volume of liquid moved was $3 \times 10^{-4}$ cubic centimeters per second per volt. In the 0.5 mm. capillary the liquid moved 0.15 centimeter per second per volt. Specifically upon the application of a current of 17.1 microamperes for 20.4 seconds the liquid moved one centimeter to the left in one test. In another test, a current of 15.8 microamperes applied for 25.6 seconds in the reverse direction caused movement of one centimeter to the right.

In operation, the device of the invention is connected to a suitable current or voltage source by means of the leads 18, 20. As a voltage is impressed between the electrodes 14, 16, electro-osmosis causes movement of the polar liquid through the disc 12 and a consequent movement of the liquid in the capillary 22 as indicated by the change in position of the gas bubble observed on the scale 24. Depending upon the direction of the voltage impressed, the liquid will move to the left or right when the device is horizontal or will rise or fall if it is in the vertical position. If the voltage is interrupted, the position of the liquid in the capillary 22 will remain relatively unchanged if the pore size is sufficiently small. When a suitable shunt S is connected across the leads 18, 20, the device, when properly calibrated, will measure the quantity of current passed over an interval of time, that is, will integrate the passage of current in the circuit.

For example, as shown in FIG. 2, the device D of the invention may be connected to a battery B which in turn is connected to a load or a charging circuit, a shunt S, being connected across the device D and being of such a value that the device D will indicate charge and discharge of the battery B. In this specific application, the invention is used as a state of charge indicator.

With a suitably calibrated shunt, the device of the invention may be placed in any D.C. line and will integrate the current passed over an interval of time.

We claim:

1. An electro-osmotic integrator comprising a vessel filled with a polar liquid; a porous disc dividing said vessel into two compartments; a pair of electrodes in close proximity to said disc, one of said electrodes being in each of said compartments; leads to said electrodes; a capillary tube filled with said polar liquid and communicating between said compartments; and indicator means movable with said polar liquid in said capillary tube, said capillary tube being calibrated in order to record the movement of said indicator means with said polar liquid and to give an indication of a voltage applied between said electrodes.

2. A device as defined by claim 1 in which said electrodes are comprised of the silver metal-ionized silver ($Ag^+$) redox couple.

3. A device as defined by claim 1 in which said disc is fritted glass.

4. A device as defined by claim 3 in which the pores of said disc have an average diameter of about 0.01 to 1 micron.

5. An electro-osmotic integrator comprising a vessel filled with a polar liquid; a porous disc dividing said vessel into two compartments, said porous disc having pores of from about 0.01 to 1 micron in diameter; a pair of $Ag/Ag^+$ electrodes in close proximity to said disc, one of said electrodes being in each of said compartments; leads to said electrodes; a capillary tube filled with said polar liquid and communicating between said compartments; and a gas bubble in said capillary tube; said capillary tube being calibrated in order to record the movement of said gas bubble therein and to give an indication of a voltage applied between said electrodes.

6. A circuit comprising an electro-osmotic integrator comprising a vessel filled with a polar liquid; a porous disc dividing said vessel into two compartments; a pair of electrodes in close proximity to said disc, one of said electrodes being in each of said compartments; leads to said electrodes; a capillary tube filled with said polar liquid and communicating between said compartments; indicator means movable with said polar liquid in said capillary tube; and a shunt connected across said leads, said capillary tube being calibrated in order to record the movement of said indicator means with said polar liquid and to give an indication of a current passed through said circuit.

References Cited by the Examiner

UNITED STATES PATENTS

| | | | |
|---|---|---|---|
| 1,171,279 | 2/16 | Tuttle | 324—94 |
| 1,217,302 | 2/17 | Hall | 324—94 |
| 2,615,940 | 10/52 | Williams | 317—231 |
| 2,644,901 | 7/53 | Hardway | 317—231 |
| 2,890,414 | 6/59 | Snavely | 324—94 |

OTHER REFERENCES

Publication by Hurd and Lance at pages 727–730 of the Journal of the Electrochemical Society, volume 104, No. 12, December 1957.

WALTER L. CARLSON, *Primary Examiner.*

ELI SAX, *Examiner.*